United States Patent
Yokota

(10) Patent No.: US 8,403,099 B2
(45) Date of Patent: Mar. 26, 2013

(54) CONSTRUCTION MACHINE

(75) Inventor: Jumpei Yokota, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 355 days.

(21) Appl. No.: 12/679,815

(22) PCT Filed: Aug. 6, 2008

(86) PCT No.: PCT/JP2008/064114
§ 371 (c)(1),
(2), (4) Date: Mar. 24, 2010

(87) PCT Pub. No.: WO2009/041163
PCT Pub. Date: Apr. 2, 2009

(65) Prior Publication Data
US 2010/0192551 A1      Aug. 5, 2010

(30) Foreign Application Priority Data

Sep. 26, 2007   (JP) ................................. 2007-249384

(51) Int. Cl.
*B60K 13/04* (2006.01)
*F01N 3/00* (2006.01)

(52) U.S. Cl. .......................................... 180/309; 60/295

(58) Field of Classification Search ............... 60/295; 180/89.13, 89.17, 326, 327, 307, 296, 65.4, 180/65.1, 68.1, 68.3, 65.31, 309
See application file for complete search history.

(56) References Cited

U.S. PATENT DOCUMENTS

| | | | | |
|---|---|---|---|---|
| 3,865,209 A | * | 2/1975 | Aihara et al. ................. | 180/65.1 |
| 4,903,792 A | * | 2/1990 | Ze-ying ........................ | 180/308 |
| 5,816,350 A | * | 10/1998 | Akira et al. ................... | 180/68.1 |
| 6,325,166 B1 | * | 12/2001 | Shimada et al. ............. | 180/6.48 |
| 7,134,518 B2 | * | 11/2006 | Arai et al. ..................... | 180/68.1 |
| 7,841,314 B2 | * | 11/2010 | Nakashima et al. ...... | 123/198 E |
| 7,874,392 B2 | * | 1/2011 | Nobayashi et al. ........ | 180/89.17 |
| 7,971,671 B2 | * | 7/2011 | Suematsu .................. | 180/65.31 |
| 8,037,963 B2 | * | 10/2011 | Nishimura et al. .......... | 180/291 |
| 2002/0104491 A1 | * | 8/2002 | Izumi ......................... | 123/41.49 |
| 2003/0110669 A1 | * | 6/2003 | Watanabe et al. ............... | 37/466 |
| 2005/0188926 A1 | * | 9/2005 | Kimura et al. ............... | 123/41.7 |
| 2006/0266573 A1 | * | 11/2006 | Ishii et al. ..................... | 180/326 |
| 2008/0264048 A1 | * | 10/2008 | Nishiyama et al. ............. | 60/299 |
| 2009/0101375 A1 | * | 4/2009 | Tsukui et al. ................. | 172/776 |

FOREIGN PATENT DOCUMENTS

| | | |
|---|---|---|
| JP | 2003 328769 | 11/2003 |
| JP | 2004 169466 | 6/2004 |
| JP | 2006 274593 | 10/2006 |
| WO | WO2007/077661 | * 7/2007 |

OTHER PUBLICATIONS

U.S. Appl. No. 12/682,193, filed Apr. 8, 2010, Yokota.

* cited by examiner

*Primary Examiner* — Kenneth Bomberg
*Assistant Examiner* — Dapinder Singh
(74) *Attorney, Agent, or Firm* — Oblon, Spivak, McClelland, Maier & Neustadt, L.L.P.

(57) ABSTRACT

A construction machine that permits an exhaust gas aftertreatment device to be disposed while suppressing an increase of height. An upper surface of a hydraulic pump is positioned lower than an upper surface of an engine, a tank device having at least one of a working oil tank and a fuel tank is provided at a rear portion thereof with a small height portion which has an upper surface of a height almost equal to or smaller than the height of the upper surface of the hydraulic tank, and an exhaust gas after-treatment device is disposed at a position above both the small height portion and the hydraulic pump.

7 Claims, 15 Drawing Sheets

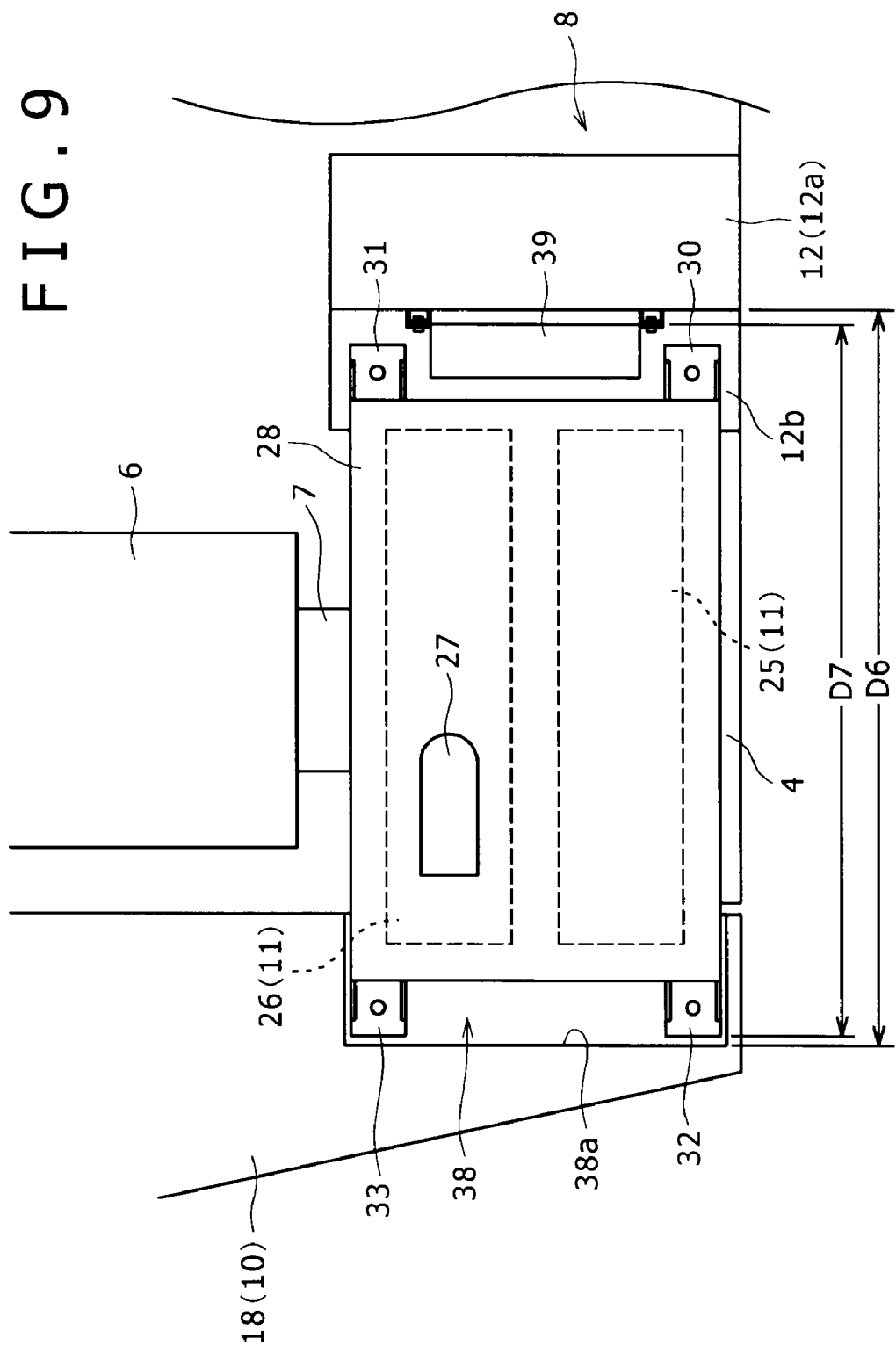

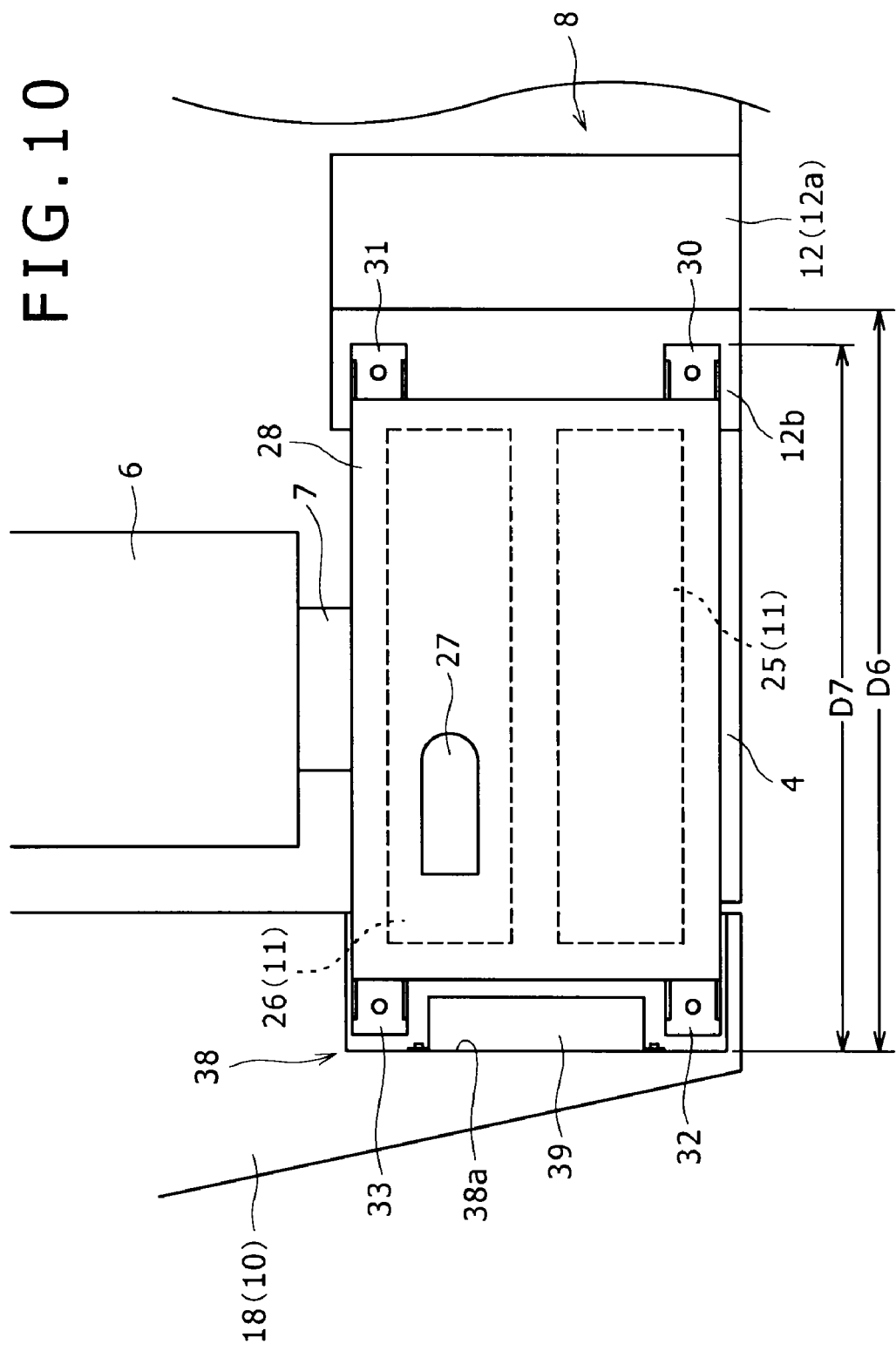

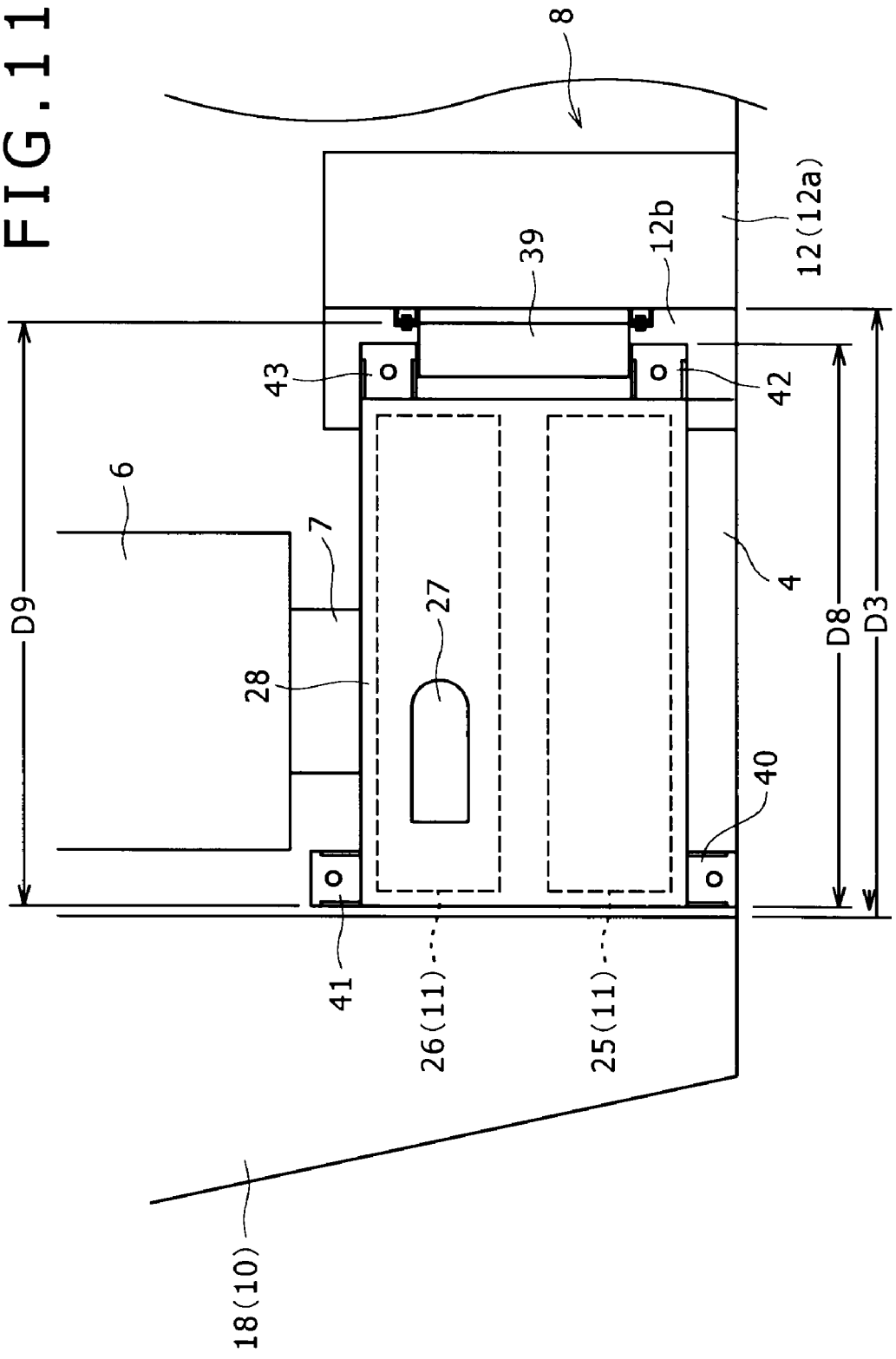

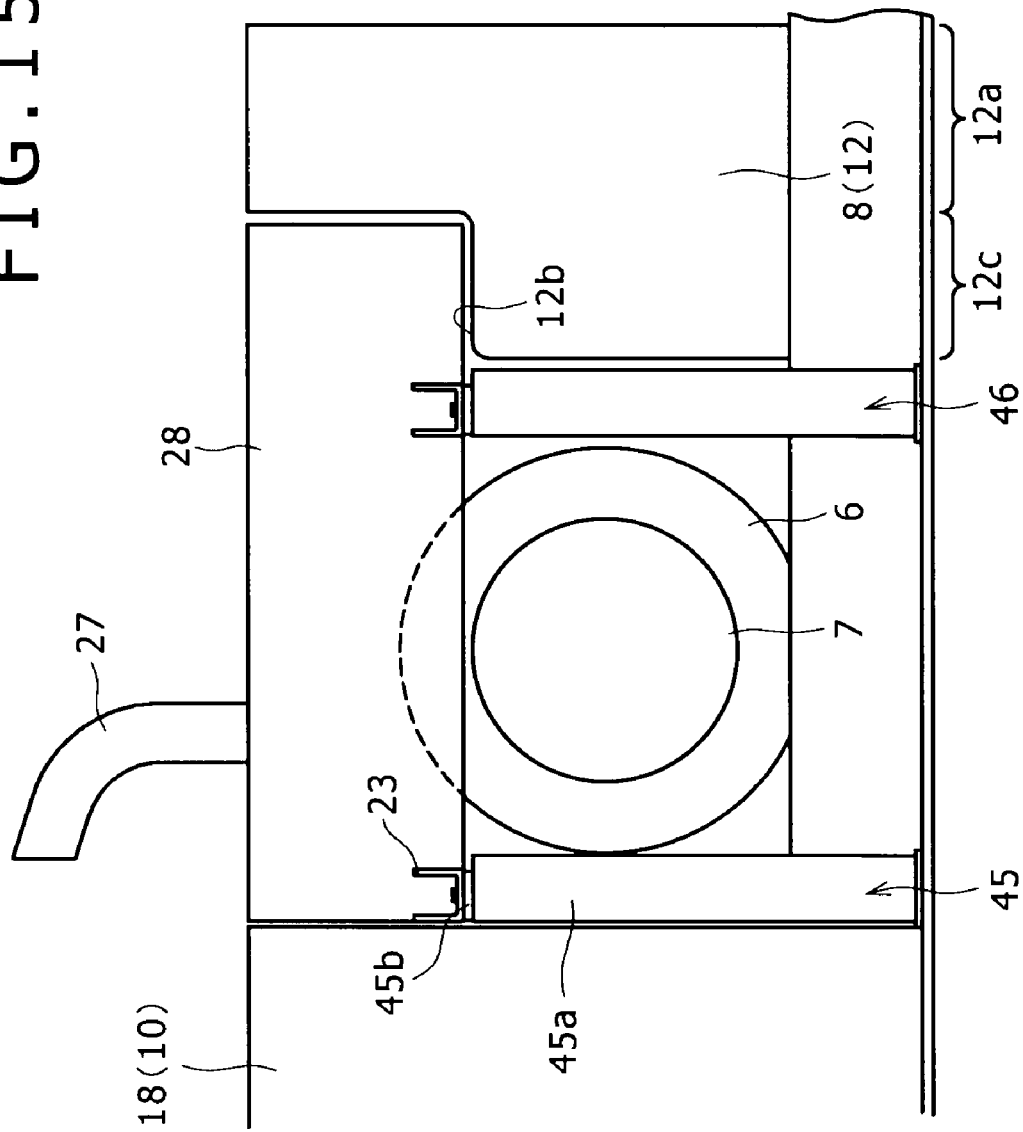

CONSTRUCTION MACHINE

TECHNICAL FIELD

The present invention relates to a construction machine provided with an exhaust gas after-treatment device for purifying exhaust gas from an engine.

BACKGROUND ART

Heretofore, there has been known a construction machine provided with a base frame which supports a working attachment so as to be raised and lowered and also provided with an engine installed on the base frame.

In construction machines of this type it has recently been desired that an exhaust gas after-treatment device for purifying exhaust gas from an engine be installed on a base frame.

More particularly, the aforesaid exhaust gas after-treatment device has a DPF (Diesel Particulate Filter) for decreasing the amount of dust such as soot and mist contained in the engine exhaust gas and also has a reduction catalyst for decreasing the amount of NOx contained in the exhaust gas (see, for example, Patent Documents 1 and 2).

However, since the engine and related peripheral devices (e.g., hydraulic systems) are disposed in a planarly massed layout on the base frame, it is difficult to newly ensure on the base frame a space as a planar space for disposing the exhaust gas after-treatment device, and if a new space is ensured above the base frame, the construction machine itself becomes larger in height.

[Patent Document 1] Japanese Patent Laid-Open Publication No. 2003-90214

[Patent Document 2] Japanese Patent Laid-Open Publication No. 2003-120277

DISCLOSURE OF THE INVENTION

The present invention has been accomplished in view of the above-mentioned problem and it is an object of the invention to provide a construction machine which permits an exhaust gas after-treatment device to be disposed while suppressing an increase of height.

In order to solve the foregoing problem, the present invention provides a construction machine having a working attachment, the construction machine including a base frame for supporting the working attachment so as to be raised and lowered, an engine installed on the base frame, a hydraulic pump connected transversely to the engine so as to become capable of being operated with the power of the engine, a tank device disposed in front of the hydraulic pump and having at least one of a working oil tank and a fuel tank, and an exhaust gas after-treatment device for purifying exhaust gas from the engine, wherein an upper surface of the hydraulic pump is positioned lower than an upper surface of the engine, the tank device has in at least a rear portion thereof a small height portion having an upper surface of a height almost equal to or smaller than the height of the upper surface of the hydraulic pump, and the exhaust gas after-treatment device is disposed at a position above both the small height portion and the hydraulic pump.

According to the present invention, since the exhaust gas after-treatment device is disposed at a position above both the small height portion, the small height portion having an upper surface of a height almost equal to or smaller than the height of the upper surface of the hydraulic pump, and the hydraulic pump, the height of the entire construction machine can be kept low as compared with the case where the exhaust gas after-treatment device is disposed above the engine or the tank device without modification.

By the description "has in at least a rear portion thereof a small height portion" as referred to herein is meant to include a structure wherein the height of the entire upper surface of the tank device is set to almost equal to or smaller than the height of the upper surface of the hydraulic pump and the whole of the tank device is formed as the small height portion.

BRIEF DESCRIPTION OF THE DRAWINGS

FIG. 9 is a diagram corresponding to FIG. 4, showing an exhaust gas after-treatment device according to a further another embodiment of the present invention.

FIG. 10 is a diagram corresponding to FIG. 4, showing an exhaust gas after-treatment device according to a still further another embodiment of the present invention.

FIG. 11 is a diagram corresponding to FIG. 4, showing an exhaust gas after-treatment device according to a still further another embodiment of the present invention.

FIG. 15 is a partially enlarged side view of a hydraulic excavator according to a still further another embodiment of the present invention.

BEST MODE FOR CARRYING OUT THE INVENTION

Preferred embodiments of the present invention will be described below with reference to the drawings.

Figure 1:
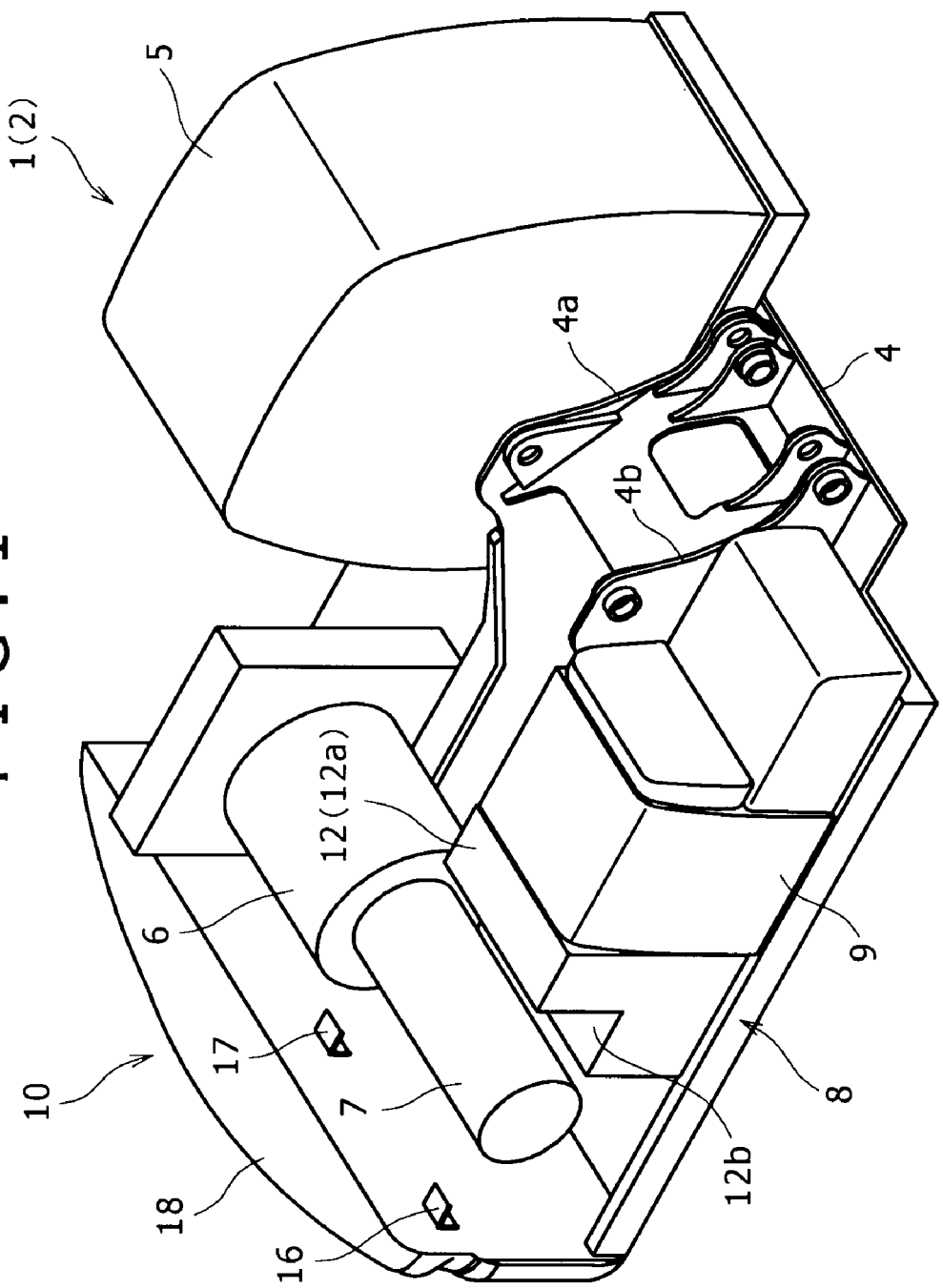
FIG. 1 is an exploded perspective view showing a basic configuration of an upper rotating body of a hydraulic excavator according to an embodiment of the present invention.
Figure 2:
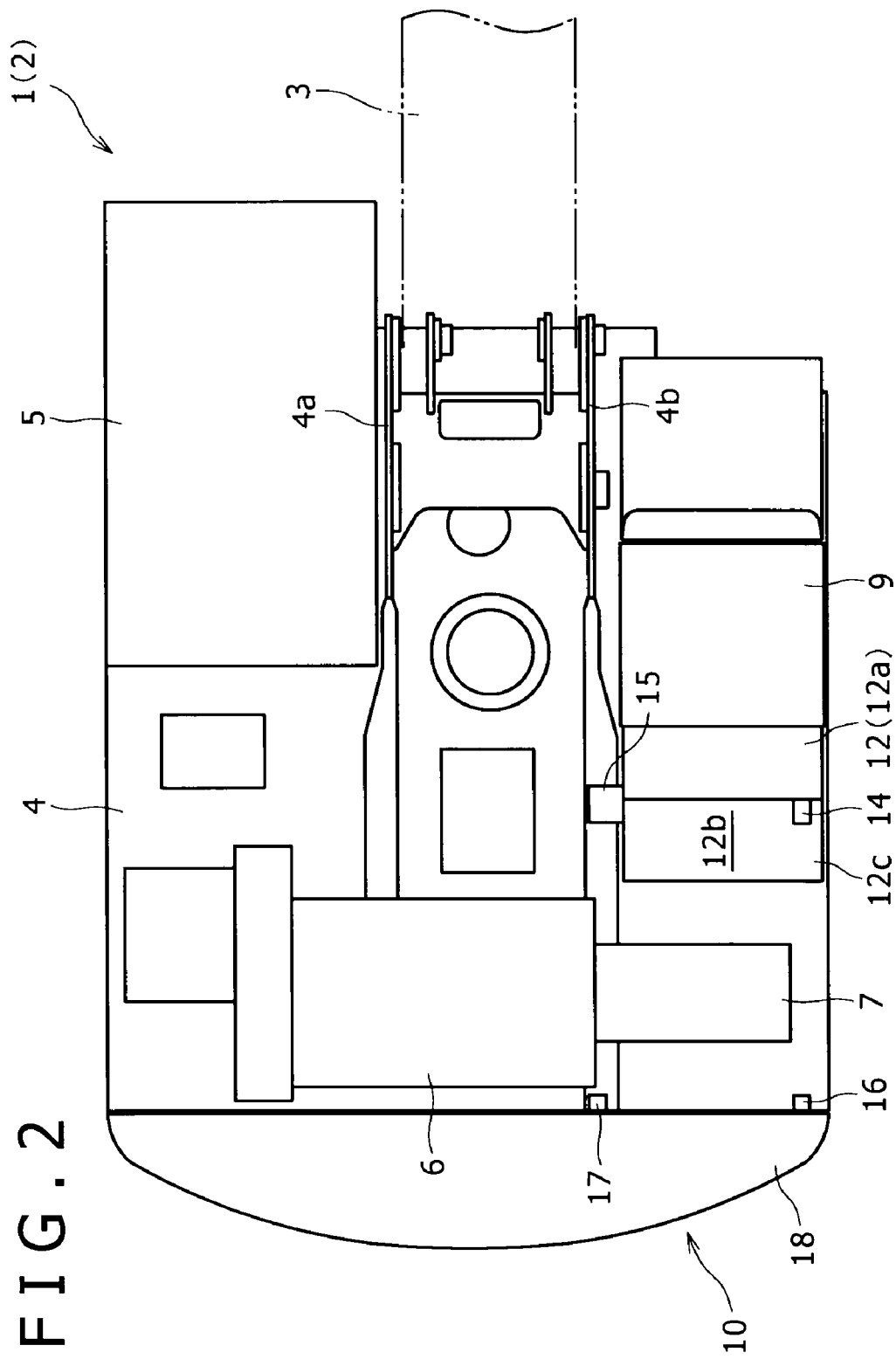
FIG. 2 is a plan view of the upper rotating body shown in FIG. 1.
Figure 3:
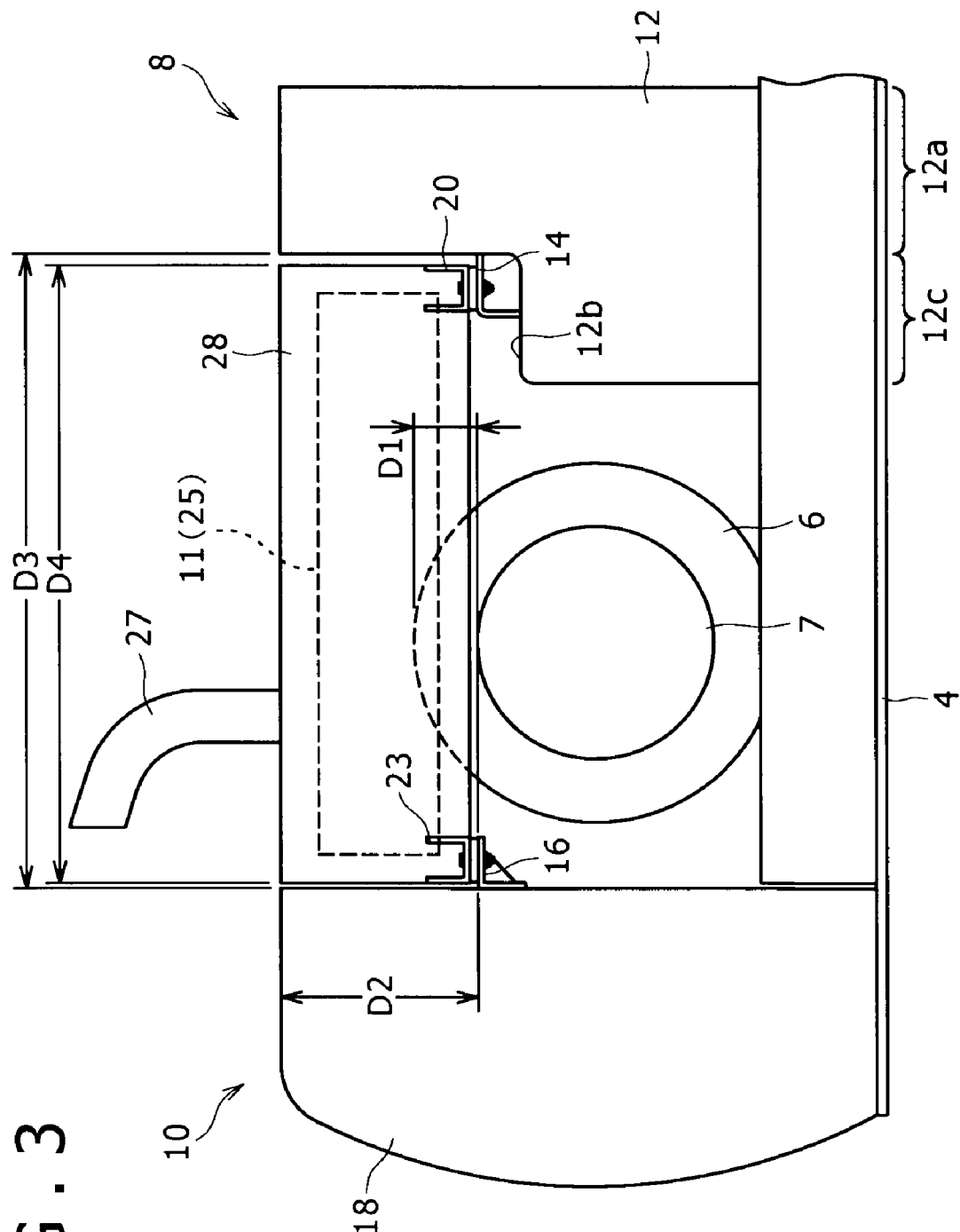
FIG. 3 is a right side view showing a state in which an exhaust gas after-treatment device is mounted on the hydraulic excavator shown in FIG. 1.

FIG. 1 is an exploded perspective view showing a basic configuration of an upper rotating body of a hydraulic excavator according to an embodiment of the present invention. FIG. 2 is a plan view of the upper rotating body shown in FIG. 1. FIG. 3 is a right side view showing a state in which an exhaust gas after-treatment device is mounted on the hydraulic excavator shown in FIG. 1.

Referring to FIGS. 1 to 3, a hydraulic excavator 1 is provided with a crawler type lower traveling body (not shown), an upper rotating body 2 mounted rotatably on the lower traveling body, and a working attachment 3 (see FIG. 2) supported so as to be raised and lowered with respect to the upper rotating body 2.

The upper rotating body 2 is provided with a base frame 4 installed on the lower traveling body, as well as a cabin 5, an engine 6, a hydraulic pump 7, a working oil tank 8, a fuel tank 9, a counterweight 10, an exhaust gas after-treatment device 11 (see FIG. 4), a casing 28 and mounting portions 20~23, which are all installed on the base frame 4. In the following description it is assumed that the direction from front to rear and the direction from right to left as seen from an operator sitting on an operator's seat (not shown) within the cabin 5 are to be longitudinal and transverse directions, respectively, of the upper rotating body 2.

A pair of left and right vertical plates 4a and 4b extending in the longitudinal direction are erected on the base frame 4 at a nearly central position in the transverse direction. The working attachment 3 is supported between front portions of the vertical plates 4a and 4b. The cabin 5 is installed at a left front position of the left vertical plate 4a.

The engine 6 is installed on the vertical plates 4a and 4b at a rear portion of the base frame 4 so that its longitudinal direction faces in the transverse direction. A right end portion of the engine 6 is disposed substantially on the right vertical plate 4b.

The hydraulic pump 7 is connected transversely to the engine 6 so as to become capable of being operated with the power of the engine 6. More specifically, the engine 6 is provided on its right end face with an output shaft (not shown) projecting rightwards and this output shaft and a transversely extending input shaft (not shown) of the hydraulic pump 7 are connected with each other through a coupling or the like. As a result, the hydraulic pump 7 is disposed in an area from above the right vertical plate 4b to the right side of the same plate (see FIG. 2).

As shown in FIG. 3, an upper surface position of the hydraulic pump 7 is set lower by dimension D1 than that of the engine 6 and lower by dimension D2 than that of the counterweight 10. In this embodiment, although the details will be described later, the exhaust gas after-treatment device 11 is disposed by utilizing a difference in height between the engine 6, as well as the counterweight 10, and the hydraulic pump 7.

In this embodiment, the working oil tank 8 and the fuel tank 9 are disposed longitudinally in a line at the right-hand position of the right vertical plate 4b so as to constitute a tank device. That is, the fuel tank 9 is disposed in the front and the working oil tank 8 is disposed in the rear. As a result, the working oil tank 8 is disposed in adjacency to and in front of the hydraulic pump 7.

The working oil tank 8 is provided with a tank body 12 and brackets 14 and 15 fixed to the tank body 12.

A front portion of the tank body 12 is formed as a large height portion 12a having a height almost equal to the height of the counterweight 10 which will be described later, while a rear portion thereof is formed as a small height portion 12c having an upper surface 12b slightly lower than the upper surface of the hydraulic pump 7. As a whole, the tank body 12 is formed in L shape in side view.

In this embodiment, as shown in FIG. 3, a front-to-rear range of the upper surface 12b is set so that a distance D3 from a rear face of the large height portion 12a, which is a front end of the small height portion 12c, up to a front face of the counterweight 10 is larger than a longitudinal dimension D4 of the exhaust gas after-treatment device 11 which will be described later (in this embodiment a longitudinal dimension D4 of a casing 28 which accommodates the exhaust gas after-treatment device 11).

The bracket 14 is a metallic plate bent in L shape and is fixed to the upper surface 12b of the tank body 12 in such a manner that an upper surface thereof is positioned somewhat higher than the upper surface position of the hydraulic pump 7.

Figure 5:
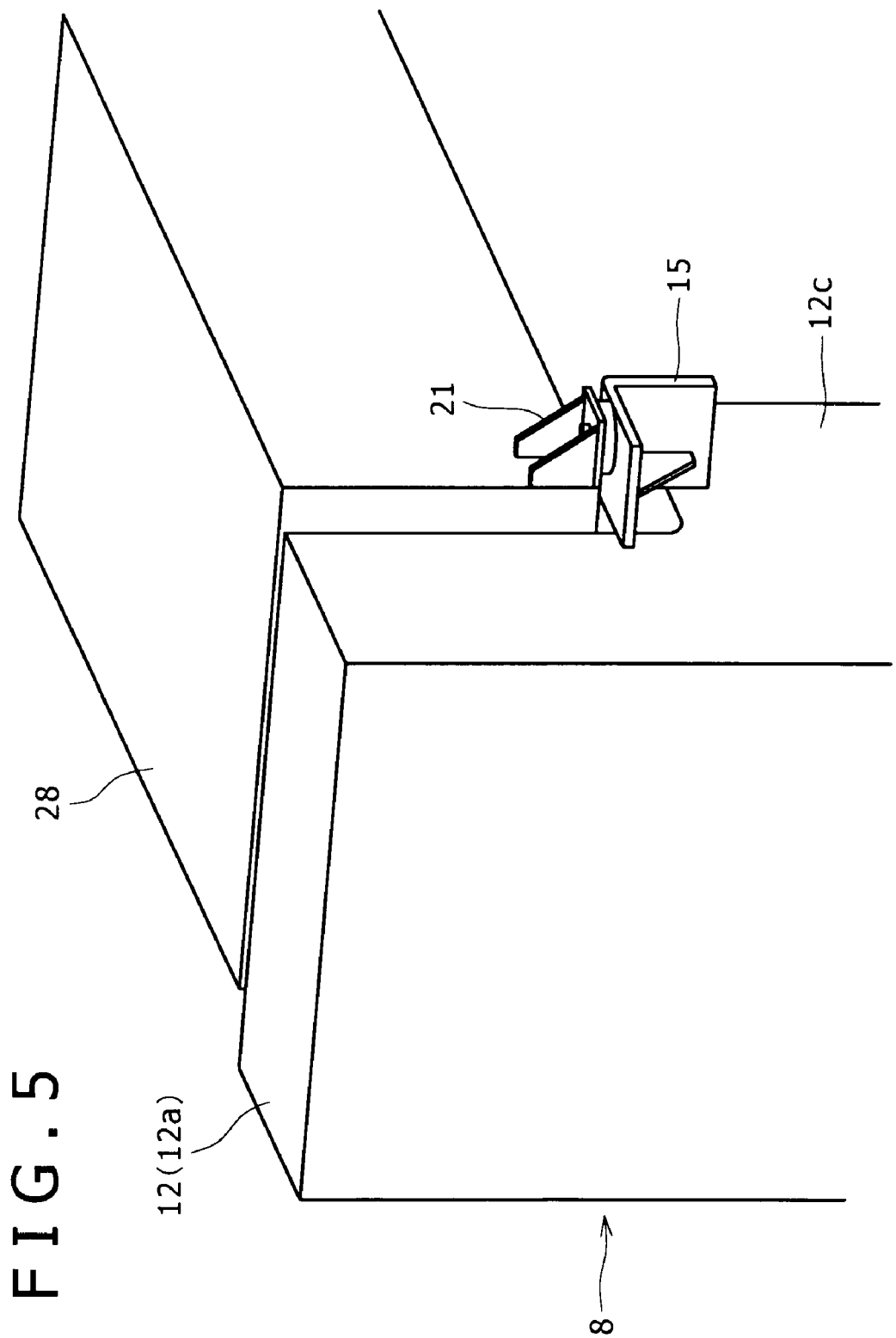
FIG. 5 is a perspective view showing a working oil tank and an exhaust gas treatment device both shown in FIG. 4.

On the other hand, as shown in FIG. 5, the bracket 15 is a metallic plate bent in L shape and is fixed to a left side face of the tank body 12 and over both the large height portion 12a and the small height portion 12c. Further, the bracket 15 is fixed to the tank body 12 in such a manner that an upper surface thereof lies at the same height position and same longitudinal position as the upper surface of the bracket 14.

Referring to FIGS. 1 to 3, the counterweight 10 is disposed behind the hydraulic pump 7 and it is provided with a weight body 18 and brackets 16 and 17 fixed to a front face of the weight body 18.

The bracket 16 is disposed at a position longitudinally opposed to the bracket 14 and it is a metallic plate bent in L shape. The bracket 16 is mounted to the weight body 18 so that an upper surface thereof lies at the same height position as the upper surface of the bracket 14.

The bracket 17 is longitudinally opposed to the bracket 15 and it is of the same configuration as that of the bracket 16 except that it is juxtaposed transversely to the bracket 16. Therefore, an explanation thereof is here omitted.

Figure 4:
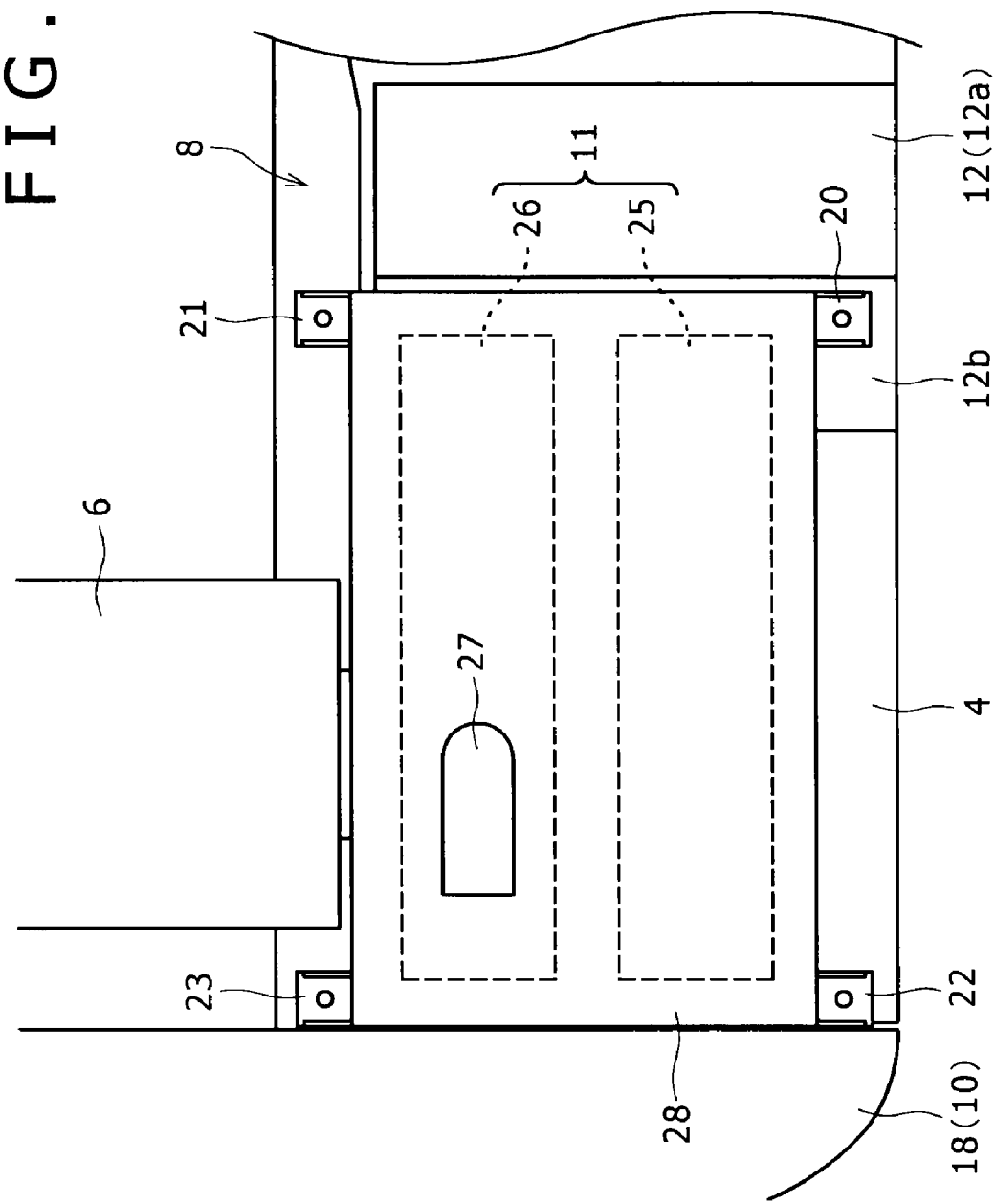
FIG. 4 is a partially schematic plan view of the exhaust gas after-treatment device shown in FIG. 3.

FIG. 4 is a partially schematic plan view of the exhaust gas after-treatment device 11 shown in FIG. 3.

Referring to FIGS. 2 to 4, the exhaust gas after-treatment device 11 is provided with a first treatment section 25 connected to an exhaust passage of the engine 6 and a second treatment section 26 which receives gas discharged from the first treatment section 25 and discharges it through an exhaust pipe 27.

The first treatment section 25 has a filter (Diesel Particulate Filter, hereinafter referred to as DPF, not shown) for removing soot and mist contained in the exhaust gas from the engine 6. The DPF has the ability to collect soot, etc. contained in the exhaust gas flowing through the interior thereof, and the dust collecting ability can be regenerated by burning the collected dust at a high temperature.

The second treatment section 26 has a catalyst layer for removing NOx contained in the exhaust gas from the engine 6. This catalyst layer allows the exhaust gas sprayed with aqueous urea to pass through the interior thereof, thereby inducing a so-called denitration reaction to decompose nitrogen oxides (NOx) contained in the exhaust gas into nitrogen, oxygen and water. That is, the catalyst layer uses urea as a reducing agent.

In this embodiment, as shown in FIG. 4, the first treatment section 25 is disposed on the right and the second treatment section 26 on the left, but the treatment sections 25 and 26 may be disposed reversely. According to this layout, the first treatment section 25 and the engine are disposed nearer so as to shorten the pipe which connects them, and as a result of the shorten pipe, the temperature of the exhaust gas fed to the first treatment section 25 can be held higher, and therefore the treatment efficiency of the first treatment section 25 can be enhanced.

The casing 28, which accommodates the treatment sections 25 and 26, has a planar shape (rectangular shape) of a size capable of being fitted in among the engine 6, the working oil tank 8 and the counterweight 10. More specifically, a transverse width dimension of the casing 28 is set a little smaller than the spacing between the engine 6 and a right edge portion of the base frame 4, (i.e., a guard panel which constitutes a side face of the upper rotating body 2), and the longitudinal dimension D4 of the casing 28 is set smaller than the longitudinal dimension D3 from the front face of the counterweight 10 to the rear face of the large height portion 12a of the tank body 12.

The mounting portions 20~23 are each a metallic plate bent in U shape which opens upward. Further, the mounting portions 20~23 are formed projectingly right- or leftwards and outwards from the casing 28 so as to occupy positions corresponding to the brackets 14~47, respectively.

More specifically, the mounting portion 20 extends rightwards from a right side face of the casing 28 so as to become capable of being mounted to the bracket 14, the mounting portion 21 extends leftwards from a left side face of the casing 28 so as to become capable of being mounted to the bracket 15, the mounting portion 22 extends rightwards from the right side face of the casing 28 so as to become capable of being mounted to the bracket 16, and the mounting portion 23 extends leftwards from the left side face of the casing 28 so as to become capable of being mounted to the bracket 17.

By mounting the mounting portions 20~23 to the brackets 14~17 with bolts or the like, the exhaust gas after-treatment device 11 can be fitted in and fixed among the engine 6, the working oil tank 8 (the large height portion 12a) and the counterweight 10 while effectively utilizing the difference in height, D1, between the engine 6 and the hydraulic pump 7, as shown in FIG. 3. Although in this embodiment reference is made to the configuration having the casing 28, the casing 28 may be omitted. In this case, however, it becomes necessary to install the first and second treatment sections 25 and 26 directly onto the base frame 4.

According to the above embodiment, as described above, since the exhaust gas after-treatment device 11 is disposed at a position above both the small height portion 12c, the small height portion 12c having a height smaller than the height of the upper surface of the hydraulic pump 7, and the hydraulic pump 7, an overall height of the hydraulic excavator 1 can be suppressed low in comparison with the case where the exhaust gas after-treatment device 11 is disposed above the engine 6 or the working oil tank 7 without modification.

In the above embodiment the exhaust gas after-treatment device 11 is installed in the longitudinal range D3 from the front end of the small height portion 12c, which has a height smaller than that of the upper surface of the hydraulic pump 7, up to the front face of the counterweight 10 and at a position above both the small height portion 12c and the hydraulic pump 7. That is, the exhaust gas after-treatment device 11 can be fitted in among the counterweight 10, the engine 6 and the working oil tank 8.

In the above embodiment, since the small height portion 12c and the large height portion 12a are integrally provided in the tank body 12, it is possible to suppress the entry of air into the working oil at the time of supplying working oil from the working oil tank 8 to hydraulic devices (e.g., a hydraulic cylinder and a hydraulic motor).

That is, the working oil is usually sucked out from a suction port (not shown) formed in a lower portion of the working oil tank 8 so as to lead out the working oil from the working oil tank 8. And the difference in height between the liquid level of the working oil and the suction port becomes smaller in the case where the whole of the working oil tank 8 is formed low. And therefore the suction port may be opened to the air layer in the working oil tank 8 even upon slight tilting of the hydraulic excavator 1. On the other hand, by leaving the large height portion 12a at the front portion of the tank body 12 as in the above configuration, the liquid level can be raised up to the interior of the large height portion, and therefore it is possible to suppress the entry of air into the working oil upon tilting of the hydraulic excavator 1.

According to the structure of the above embodiment, moreover, since the mounting portions 20~23 project left- or rightwards and outwards from the exhaust gas after-treatment device 11, it is possible to form the mounting portions 20~23 without enlarging the longitudinal dimension for disposing the exhaust gas after-treatment device 11.

Further, since only the small height portion 12c is necessary for obtaining the range D3 for disposing the exhaust gas after-treatment device 11, and the other portion is left as the large height portion 12a, the exhaust gas after-treatment device 11 can be disposed appropriately while ensuring the tank capacity.

Figure 6:
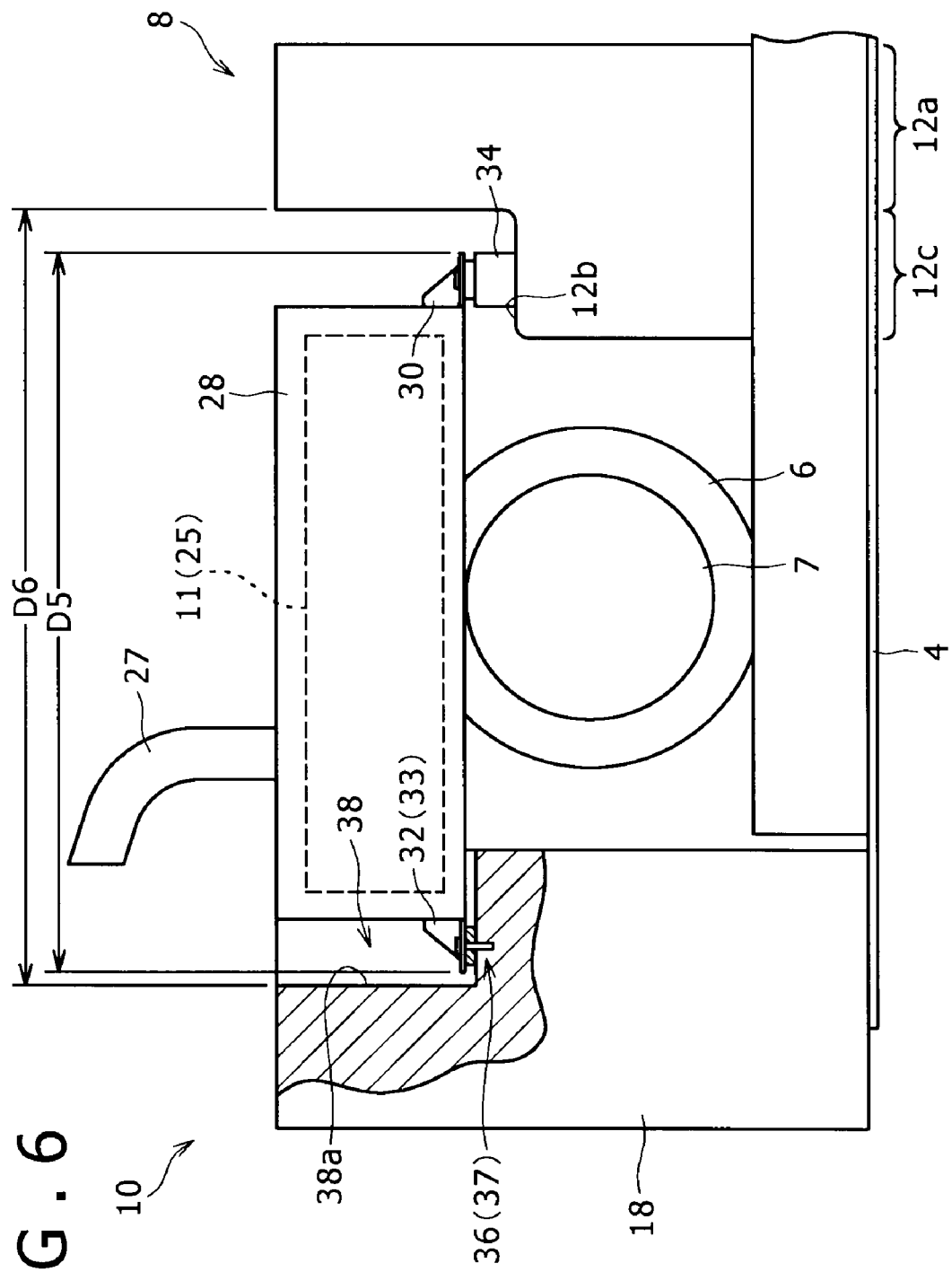
FIG. 6 is a partially schematic side view of a hydraulic excavator according to another embodiment of the present invention.
Figure 7:
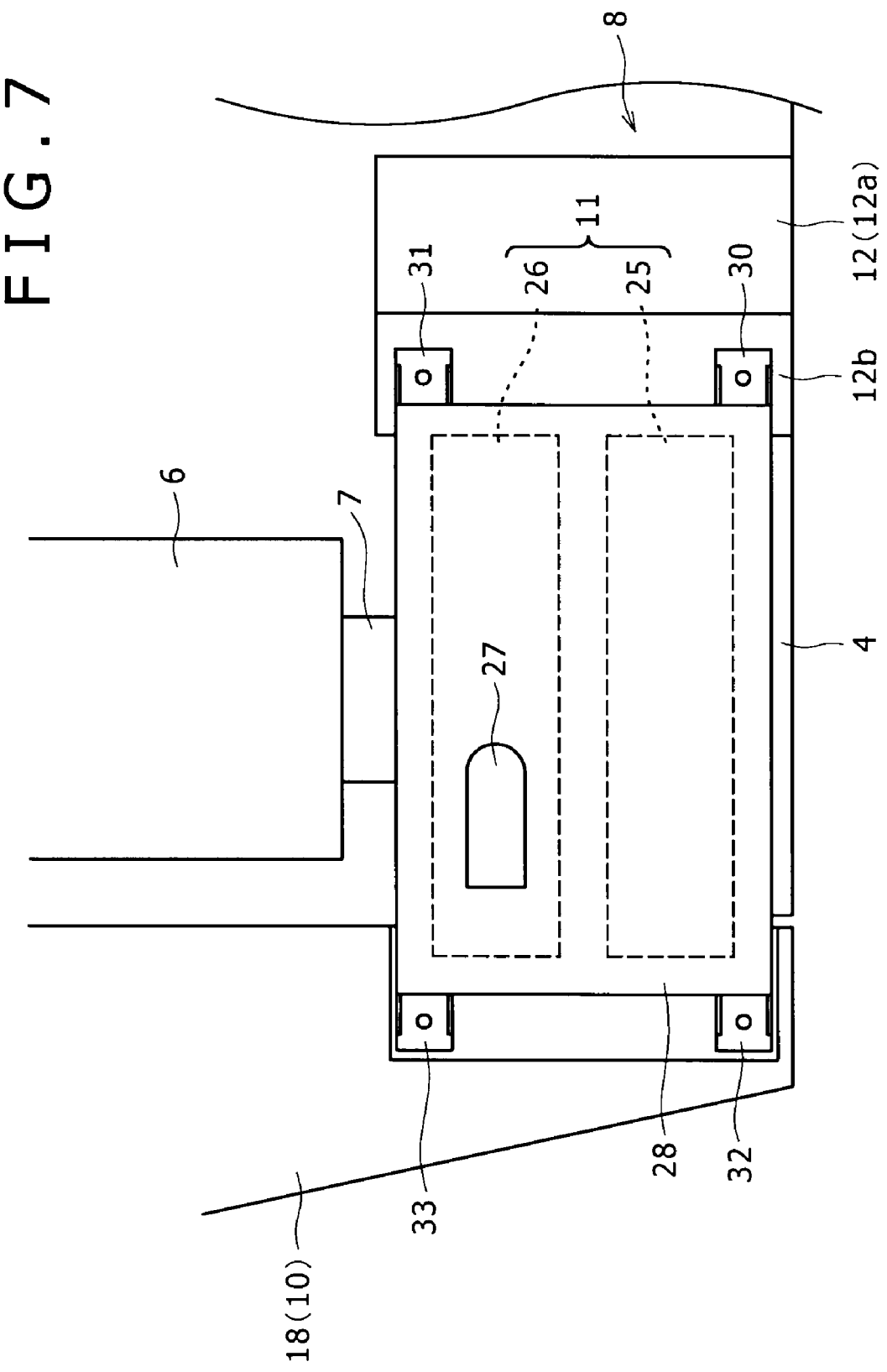
FIG. 7 is a plan view of the hydraulic excavator shown in FIG. 6.
Figure 8:
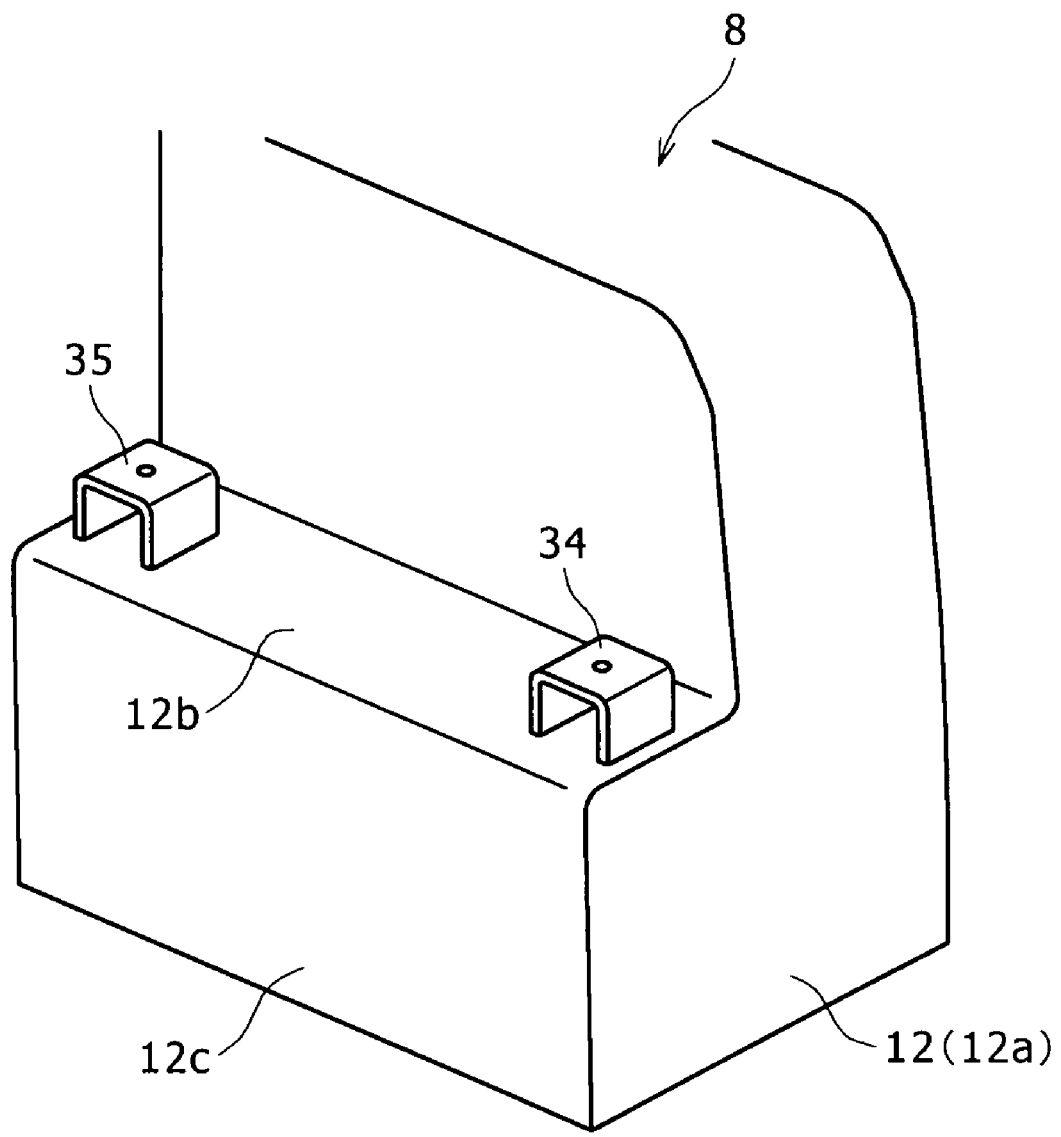
FIG. 8 is a perspective view of a working oil tank shown in FIG. 6.

Another embodiment of the present invention will be described below with reference to FIGS. 6 to 8. FIG. 6 is a partially schematic side view of a hydraulic excavator according to another embodiment of the present invention. FIG. 7 is a plan view of the hydraulic excavator shown in FIG. 6. FIG. 8 is a perspective view of a hydraulic tank shown in FIG. 6. As to the same structural portions as in the previous embodiment, they are identified by the same reference numerals as in the previous embodiment and explanations thereof will be omitted.

This embodiment is different from the previous embodiment in that the mounting portions 20~23 are substituted by a pair of projecting mounting portions 30 and 31 projecting forward from a front end face of the casing 28 and a pair of right and left projecting mounting portions 32 and 33 projecting backward from a rear end face of the casing 28, that the working oil tank 8 has a pair of right and left brackets 34 and 35 on the upper surface 12b of the tank body 12, and a recess 38 is formed on the front face of the counterweight 10 so as to be retreated from the other portion, and internally threaded portions 36 and 37 for fixing the projecting mounting portions 32 and 33 are formed in the recess 38.

That is, in this embodiment, since the projecting mounting portions 30~33 are projected in the longitudinal direction from the exhaust gas after-treatment device 11, the transverse dimension for disposing the exhaust gas after-treatment device 11 is made smaller accordingly. Consequently, the brackets 34 and 35 are installed on the upper surface 12b of the tank body 12, as shown in FIG. 8.

Conversely, because of the presence of the projecting mounting portions 30~33, a longitudinal dimension D5 of the exhaust gas after-treatment device 11 is larger than the distance D3 (see FIG. 3) from the rear face of the large height portion 12a, which is a front end of the upper surface 12b, to the front face of the counterweight 10. In this embodiment, therefore, a longitudinal dimension D6 from a front face 38a of the counterweight 10 where the recess 38 is formed up to the rear face of the large height portion 12a is set larger than the longitudinal dimension D5 of the exhaust gas after-treatment device 11. Consequently, the exhaust gas after-treatment device 11 can be fitted in between the working oil tank 8 and the counterweight 10 while ensuring the tank capacity of the working oil tank 8.

In each of the above embodiments, reference is made to an example in which a catalyst using urea as a reducing agent is utilized as the second treatment section 26 (see FIGS. 4 and 7) in the exhaust gas after-treatment device 11, and the provision of an aqueous urea tank is needed for supply of the urea.

In this connection, as shown in FIGS. 9 and 10, the aqueous urea tank 39 can be longitudinally juxtaposed to the exhaust gas after-treatment device 11 within the longitudinal range from the rear face of the large height portion 12a to the front face 38a of the counterweight 10 where the recess 38 is formed. According to this layout, the aqueous urea tank 39 is disposed such that also it can be fitted in among the counterweight 10, the engine 6 and the working oil tank 8, thus making it possible to keep the height of the hydraulic pump 1 low.

Moreover, in the configuration provided with the projecting mounting portions 30~33 as in the embodiment illustrated in FIGS. 6 to 8, the aqueous urea tank 39 can be disposed between the projecting mounting portions 30 and 31, namely, on the upper surface 12b of the tank body 12, as shown in FIG. 9, or between the projecting mounting portions 32 and 33, namely, within the recess 38 of the counterweight 10, as shown in FIG. 10.

For disposing the aqueous urea tank 39 in such a layout it is necessary that the longitudinal dimension D6 from the front face 38a of the counterweight 10 where the recess 38 is formed up to the rear face of the large height portion 12a be set larger than a total dimension D7 of the longitudinally juxtaposed aqueous urea tank 39 and exhaust gas after-treatment device 11 (in this embodiment a dimension of the longitudinally juxtaposed casing 28, projecting mounting portions 30~33 and aqueous urea tank 39).

In the case of FIG. 9 it is necessary that the spacing between the projecting mounting portions 30 and 31 be larger than the transverse dimension of the aqueous urea tank 39. In the case of FIG. 10 it is necessary that the spacing between the projecting mounting portions 32 and 33 be larger than the transverse dimension of the aqueous urea tank 39.

FIGS. 1 to 5 referred to above disclose only the projecting mounting portions 20~23 projecting in the transverse direction from the exhaust gas after-treatment device 11, while FIGS. 6 to 10 disclose only the projecting mounting portions 30~33 projecting in the longitudinal direction from the exhaust gas after-treatment device 11. However, there may be adopted a configuration wherein a pair of mounting portions 40 and 41 projects transversely from rear-end side faces of the casing 28 and a pair of projecting mounting portions 42 and 43 projects forwards from a front end face of the casing 28, as shown in FIG. 11.

Also in this embodiment it is necessary to set a longitudinal range of the upper surface 12b of the tank body 12 so that the distance D3 from the front face of the counterweight 10 to the rear face of the large height portion 12a of the tank body 12 becomes larger than a longitudinal dimension D8 from a rear end face of the casing 28 to each of front ends of the projecting mounting portions 42 and 43. By doing so, the exhaust gas after-treatment device 11 can be fitted in between the working oil tank 8 and the counterweight 10.

Further, also in the embodiment of FIG. 11 the aqueous urea tank 39 can be disposed between the right and left projecting mounting portions 42 and 43. In this case, it is necessary to set a longitudinal range of the upper surface 12b of the tank body 12 in such a manner that the distance D3 from the front face of the counterweight 10 to the rear face of the large height portion 12a of the tank body 12 becomes larger than a longitudinal dimension D9 of the longitudinally juxtaposed aqueous urea tank 39 and the exhaust gas after-treatment device 11 (in this embodiment a dimension of the longitudinally juxtaposed casing 28, projecting mounting portions 42 or 43, and aqueous urea tank 39).

Figure 12A:
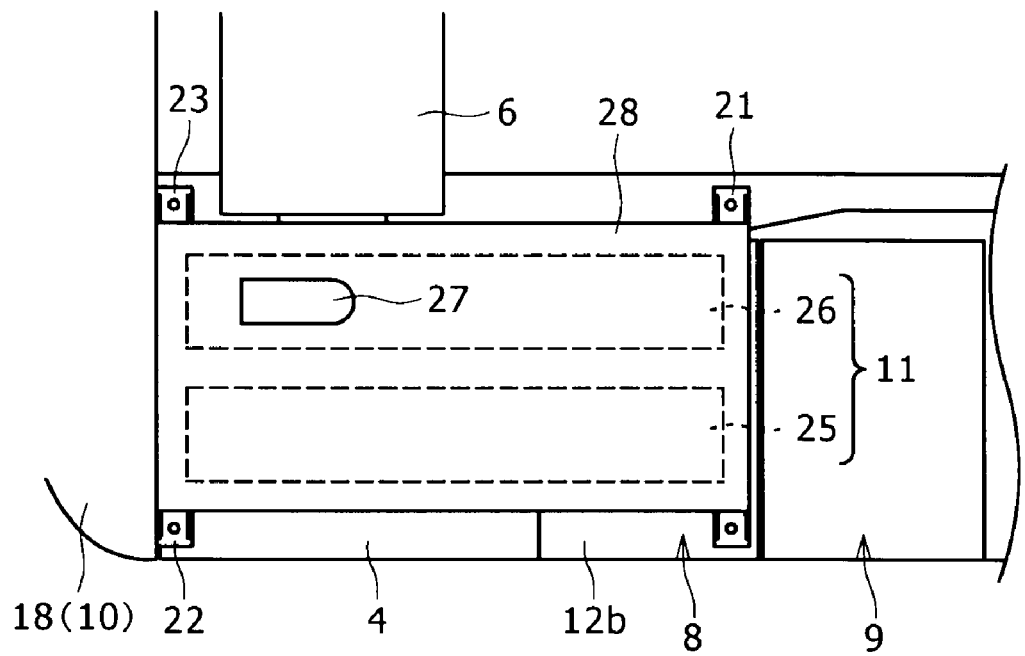
FIG. 12A is a partially enlarged plan view of a hydraulic excavator according to a still further another embodiment of the present invention.
Figure 12B:
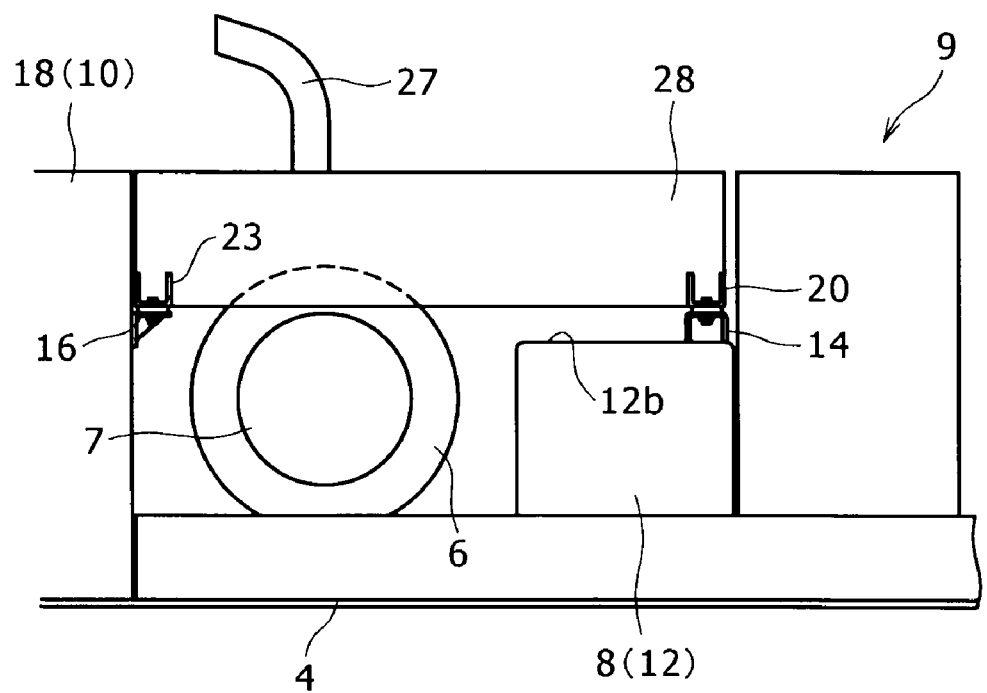
FIG. 12B is a partially enlarged side view of the embodiment of the present invention shown in FIG. 12A.

Although reference has been made in each of the above embodiments to the structure wherein the large height portion 12a is formed at the rear portion of the working oil tank 8, there may be adopted such a structural as shown in FIG. 12 wherein the entire upper surface of the working oil tank 8 is made lower than the upper surface of the hydraulic tank 7, thereby forming the whole of the working oil tank 8 as a small height portion 12c.

That is, in this embodiment, the whole of the working oil tank 8 is formed as the small height portion 12c and the height of a fuel tank 9 positioned in front of the working oil tank 8 is made almost equal to the height of the counterweight 10. As a result, a rear face of the fuel tank 9 constitutes a front end of the small height portion 12c.

In this embodiment, within a longitudinal range from the rear face of the fuel tank 9 which is the front end of the small height portion 12c to the front face of the counterweight 10, the exhaust gas after-treatment device 11 is fitted in among the engine 6, the fuel tank 9 and the counterweight 10.

According to this embodiment, in comparison with each of the previous embodiments, the longitudinally longer exhaust gas after-treatment device 11 can be disposed in response to the omission of the large height portion 12a (see FIG. 3) of the working oil tank 8.

Although in the structure of the embodiment shown in FIG. 12 the fuel tank 9 is formed as the large height portion, it is not always necessary to form the large height portion. Though not shown, there also may be adopted a structure wherein the entire upper surface of the working oil tank 8 and the fuel tank 9, (i.e., the tank device), is positioned equal to or lower than the upper surface of the hydraulic pump 7 and the exhaust gas after-treatment device 11 is disposed so as to cover the entire upper surface of the working oil tank 8 and the fuel tank 9, (i.e., the tank device).

In such a structure, an exhaust gas after-treatment device 11 which is still longer in the longitudinal direction can be disposed in the longitudinal range between a front edge portion of the fuel tank 9 corresponding to the front end of the small height portion (the whole of the working oil tank 8 and the fuel tank 9) and the front face of the counterweight 10.

In each of the above embodiments reference has been made to the structure wherein the fuel tank 9 is disposed in the front and the working oil tank 8 in the rear. However, also in the case where the layout of the tanks 8 and 9 is reversed, that is, the working oil tank 8 is disposed in the front and the fuel tank 9 in the rear, the small height portion can be formed on the fuel tank 9 or on both fuel tank 9 and working oil tank 8 like the above.

Figure 13:
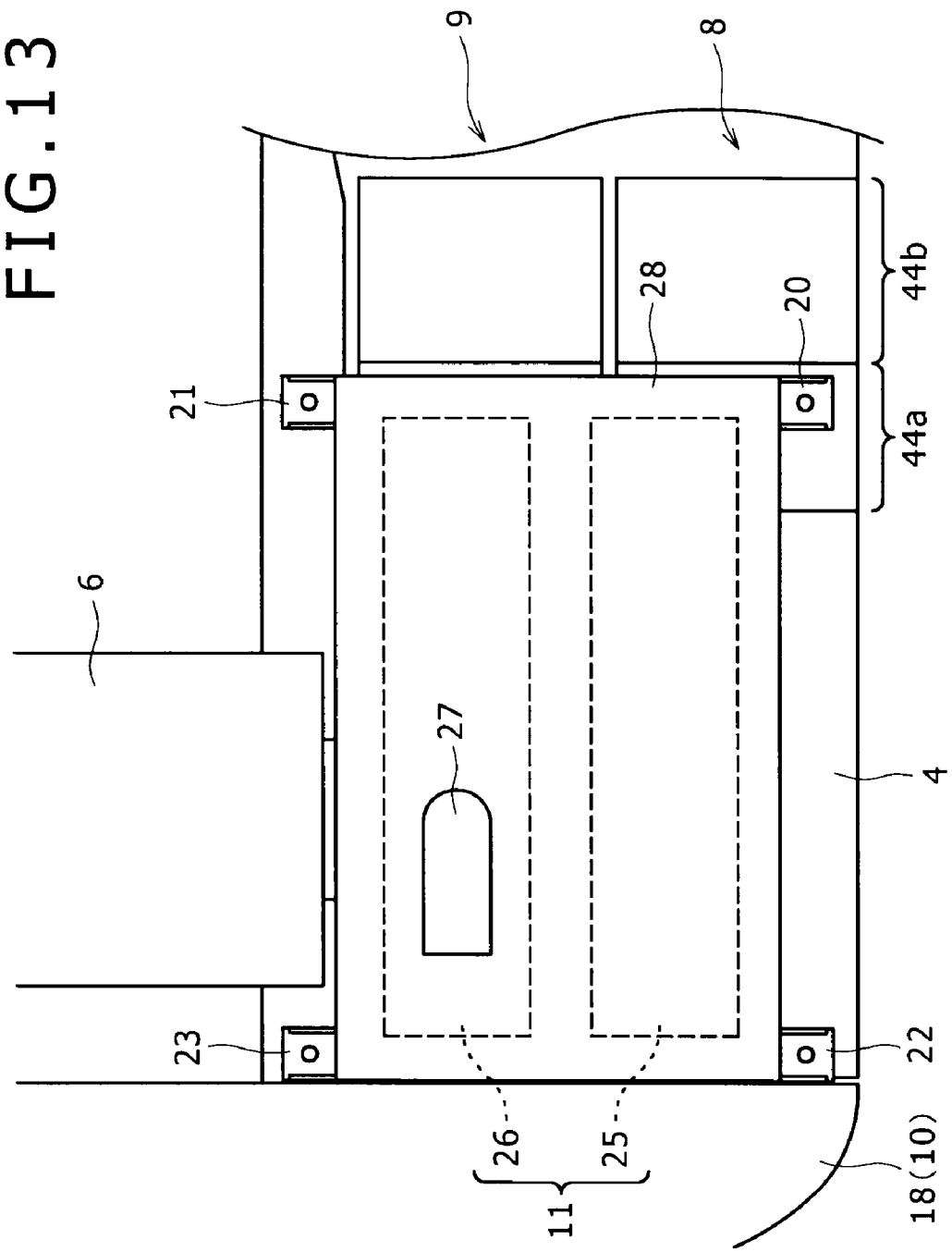
FIG. 13 is a diagram corresponding to FIG. 4, showing a still further another embodiment of the present invention.

On the other hand, there also may be adopted such a structure as shown in FIG. 13 wherein a working oil tank 8 and a fuel tank 9 are transversely juxtaposed and a small height portion 44a and a large height portion 44b are formed on each of the working oil tank 8 and the fuel tank 9. As in the previous embodiments, upper surfaces of the small height portions 44a on the working oil tank 8 and the fuel tank 9 are formed to have a height substantially equal to or lower than that of the hydraulic pump 7.

In a longitudinal range between a rear face of each large height portion 44b corresponding to a front end of the associated small height portion 44a and the front face of the counterweight 10, an exhaust gas after-treatment device 11 according to this embodiment is fitted in among the engine 6, the working oil tank 8 and the fuel tank 9, and the counterweight 10.

In this embodiment, since the small height portions 44a are provided on the working oil tank 8 and the fuel tank 9 respectively, it is not necessary to decrease the capacity of one tank to an extreme degree unlike the case where only one of both tanks 8 and 9 is formed with such a small height portion 44a.

Also in the case where the working oil tank 8 and the fuel tank 9 are transversely juxtaposed to each other as in this embodiment, the entire upper surface of the tanks 8 and 9 can be positioned at a height almost equal to or lower than the upper surface of the hydraulic pump 7 and the exhaust gas after-treatment device 11 can be disposed so as to cover the entire upper surface of both tanks 8 and 9.

Although in each of the above embodiments reference has been made to the structure having the mounting portions 20~23, 30~33 and 40~43 projecting transversely or longitudinally from the exhaust gas after-treatment device 11, there also may be adopted a structure wherein mounting portions are provided on a lower surface of the casing 28.

By doing so, in a planar layout, the exhaust gas after-treatment device 11 can be installed on the base frame 4 without interference of the mounting portions with other structural portions.

Further, although in the above embodiments reference has been made to the structure wherein the exhaust gas after-treatment device 11 is fixed to both counterweight 10 and working oil tank 8 to ensure support of the exhaust gas after-treatment device 11 by the base frame 4, a mounting member may be provided directly on the base frame 4 and the exhaust gas after-treatment device 11 may be fixed to the mounting member.

Figure 14A:
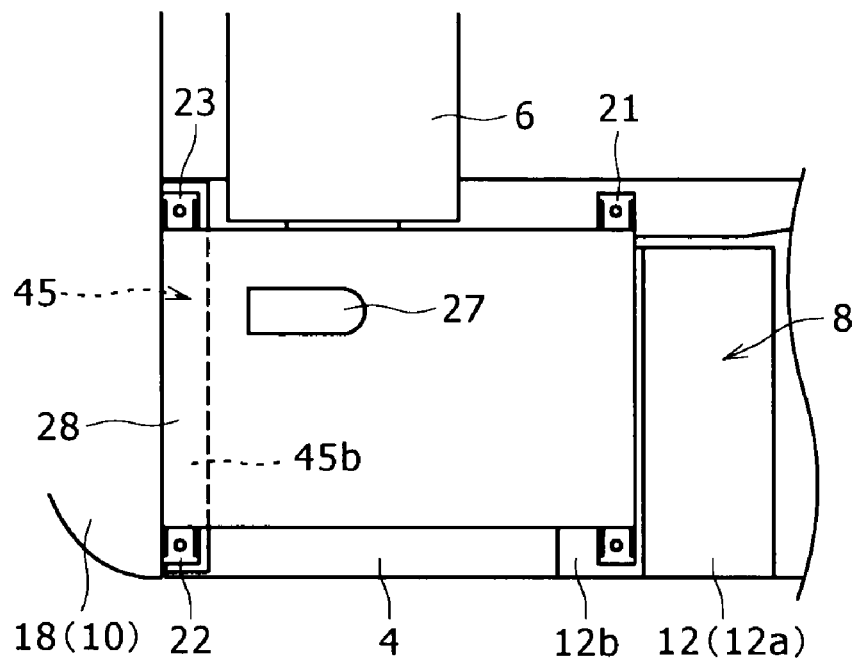
FIG. 14A is a partially enlarged plan view of a hydraulic excavator according to a still further another embodiment of the present invention.
Figure 14B:
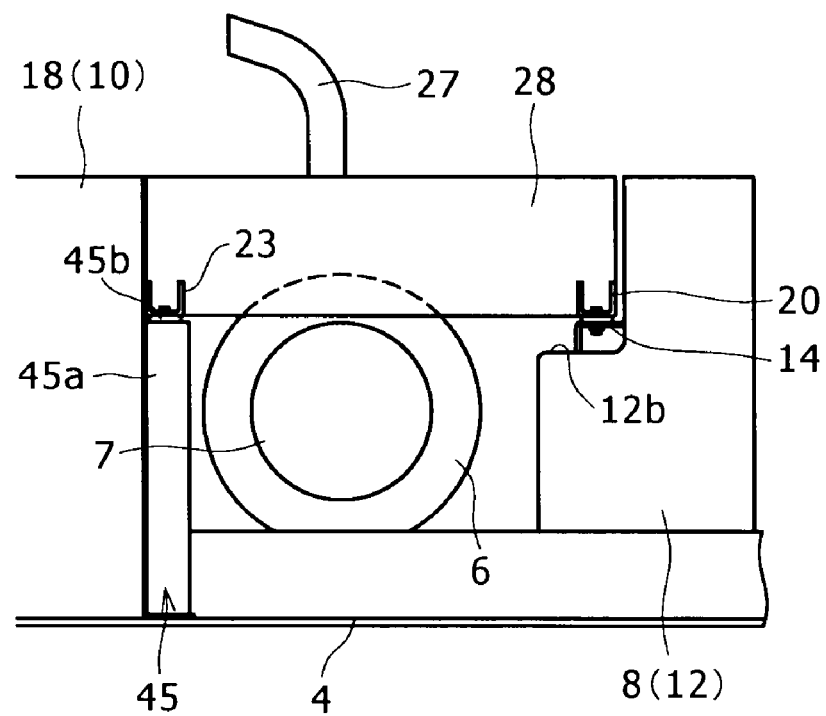
FIG. 14B is a partially enlarged side view of the embodiment of the present invention shown in FIG. 14A.

For example, a mounting member 45 shown in FIG. 14 is a plate member bent downwards at both ends thereof to give a U shape which is open downwards when seen from the rear side. In an attitude along the front face of the counterweight 10 the mounting member 45 is provided on the base frame 4.

More specifically, a pair of right and left leg portions 45a of the mounting member 45 are erected on the base frame and a top plate portion 45b which provides a connection between upper portions of the leg portions 45a in this state is disposed substantially horizontally. The top plate portion 45b is configured so that the mounting portions 22 and 23 of the exhaust gas after-treatment device 11 placed on both right and left ends of the top plate portion 45b can be fixed with bolts or the like. Thus, with the mounting member 45 it is possible to support a rear portion of the exhaust gas after-treatment device 11.

Although in connection with FIG. 14 a description is given about the structure wherein the mounting member 45 supporting the rear end portion of the exhaust gas after-treatment device 11 is disposed in front of the counterweight 10, a mounting member 46 for supporting a front portion of the exhaust gas after-treatment device 11 may be disposed in front of the hydraulic pump 7 and behind the working oil tank 8, as shown in FIG. 15. By doing so, since it becomes unnecessary to provide a mounting portion between the upper surface 12b of the small height portion 12c of the working oil tank 8 and the exhaust gas after-treatment device 11, the small height portion 12c can be made higher. And therefore the tank capacity can be made larger.

Both of mounting members 45 and 46 do not have to be provided. The mounting member 46 may be provided and the mounting member 45 may be omitted so that the rear end portion of the exhaust gas after-treatment device 11 can be supported by the counterweight 10.

Although in the above embodiments reference has been made to the structure wherein the first treatment section 25 and the second treatment section 26 are disposed so that gas flows in the longitudinal direction, both treatment sections 25 and 26 can also be disposed so that gas flows in the transverse direction. For example, in the case where the channels in the first and second treatment sections 25 and 26 are made short, it is necessary to enlarge the sectional area in order to ensure the treatment capacity and hence it is necessary that both treatment sections 25 and 26 be formed to be thick and short. In such a case, by disposing both treatment sections 25 and 26 so that gas flows in the transverse direction, both treatment sections 25 and 26 can be disposed by utilizing the space above the small height portion even when the space in the transverse direction is limited.

Inventions having the following structures are mainly included in the concrete embodiments described above.

That is, the present invention provides a construction machine having a working attachment, the construction machine including a base frame for supporting the working attachment so as to be raised and lowered, an engine installed on the base frame, a hydraulic pump connected transversely to the engine so as to become capable of being operated with the power of the engine, a tank device disposed in front of the hydraulic pump and having at least one of a working oil tank and a fuel tank, and an exhaust gas after-treatment device for purifying exhaust gas from the engine, wherein an upper surface of the hydraulic pump is positioned lower than an upper surface of the engine, the tank device has in at least a rear portion thereof a small height portion having an upper surface of a height almost equal to or smaller than the height of the upper surface of the hydraulic pump, and the exhaust gas after-treatment device is disposed at a position above both the small height portion and the hydraulic pump.

According to the present invention, since the exhaust gas after-treatment device is disposed at a position above both the small height portion, the small height portion having an upper surface of a height almost equal to or smaller than the height of the upper surface of the hydraulic pump, and the hydraulic pump, the height of the entire construction machine can be kept low as compared with the case where the exhaust gas after-treatment device is disposed on the engine or the tank device without modification.

By the description "has in at least a rear portion thereof a small height portion" as referred to herein is meant to include a structure wherein the height of the entire upper surface of the tank device is set to almost equal to or smaller than the height of the upper surface of the hydraulic pump and the whole of the tank device is formed as the small height portion.

In the above construction machine, preferably, a counterweight disposed behind the hydraulic pump is further provided, the upper surface of the hydraulic pump is positioned lower than an upper surface of the counterweight, and the exhaust gas after-treatment device is disposed in the area between a front end of the small height portion and a front face of the counterweight and at a position above both the small height portion and the hydraulic pump.

By doing so, the exhaust gas after-treatment device can be disposed like being fitted in among the counterweight, the engine and the tank device. That is, in the above structure, the exhaust gas after-treatment device can be disposed in the area between a front end of the small height portion, the small height portion having an upper surface of a height almost equal to or smaller than the upper surface of the hydraulic pump, and a front face of the counterweight and at a position above both the small height portion and the hydraulic pump.

In the above construction machine, preferably, a recess is formed on the front face of the counterweight, the recess being retreated from the other portion, and the exhaust gas after-treatment device is disposed between a portion of the front face of the counterweight where the recess is formed and the front end of the small height portion.

According to this structure, the longitudinal range from the front face of the counterweight to the front end of the small height portion can be expanded by an amount corresponding to the depressed amount of the recess, so that it becomes possible to dispose a longitudinally larger exhaust gas aftertreatment device in comparison with the case where the recess is not formed.

In the above structure, moreover, since the recess is formed in the portion required for installation of the exhaust gas after-treatment device, and the shape of the other portion of the counterweight can be kept intact, the weight required of the counterweight can be ensured while maintaining the height of the construction machine as described above.

The whole of the tank device may be formed as the small height portion, but it is particularly preferred that the tank device have a large height portion, which is higher than the upper surface of the hydraulic pump, in front of the small height portion.

According to this structure, since the area necessary for disposing the exhaust gas after-treatment device is made the small height portion, and the other portion is left as the large height portion, the exhaust gas after-treatment device can be disposed appropriately while ensuring the tank capacity.

In the above structure, unlike the case where the whole of the tank device is formed as the small height portion and the entire upper surface of the tank device is covered with the exhaust gas after-treatment device, the portion (i.e., the large height portion) released from the exhaust gas after-treatment device can be left on the upper surface of the tank device. Therefore, by forming working oil and fuel injection ports on the large height portion it is possible to perform the oil and fuel injecting work easily.

In case of forming the large height portion on the working oil tank in the tank device, it is possible to suppress the entry of air into the working oil at the time of supplying the working oil from the working oil tank to hydraulic devices.

That is, the working oil is usually sucked out from a suction port formed in a lower portion of the working oil tank so as to lead out the working oil from the working oil tank. And the difference in height between the liquid level of the working oil and the suction port becomes smaller in the case where the whole of the working oil tank is formed as the small height portion. And therefore the suction port may be opened to the air layer in the working oil tank even upon slight tilting of the construction machine. On the other hand, by forming the large height portion at the front portion of the tank body as in the above configuration, the liquid level can be raised up to the interior of the large height portion, and therefore it is possible to suppress the entry of air into the working oil upon tilting of the construction machine.

In the above construction machine it is preferable that the exhaust gas after-treatment device be provided with a first treatment section having a filter capable of collecting dust contained in the exhaust gas from the engine and a second treatment section capable of decomposing nitrogen oxides contained in the exhaust gas by utilizing a catalyst which uses urea as a reducing agent.

According to this structure not only dust such as soot and mist but also nitrogen oxides (NOx) can be removed in a single exhaust gas after-treatment device.

The above construction machine may be further provided with an aqueous urea tank which stores aqueous urea so that the aqueous urea can be supplied to the second treatment section, the aqueous urea tank being longitudinally juxtaposed to the exhaust gas after-treatment device.

According to this structure, an aqueous urea tank for the supply of aqueous urea as a catalyst can also be disposed above both the hydraulic pump and the small height portion, and whereby the height of the construction machine can be kept low.

It is preferable that the construction machine be further provided with a pair of right and left mounting portions for allowing the exhaust gas after-treatment device to be supported by the base frame, the mounting portions projecting toward the aqueous urea tank from an end on the side adjacent to the aqueous urea tank out of front and rear ends of the exhaust gas after-treatment device, the spacing between the mounting portions being set wider than a transverse dimension of the aqueous urea tank.

According to this structure, the mounting portions can be provided on both right and left sides respectively of the aqueous urea tank by utilizing the longitudinal space which is required for disposing the aqueous urea tank before or behind the exhaust gas after-treatment device, and therefore it is possible to suppress wasting of an extra space for only the provision of the mounting portions.

INDUSTRIAL APPLICABILITY

According to the present invention the exhaust gas after-treatment device can be disposed while suppressing an increase of height.

What is claimed is:

1. A construction machine having a working attachment, said construction machine comprising:
a base frame for supporting said working attachment so as to be raised and lowered;
an engine installed on said base frame;
a hydraulic pump connected transversely to said engine so as to become capable of being operated with the power of said engine;
a tank device disposed at a front of said hydraulic pump and having at least one of a working oil tank and a fuel tank;
a counterweight provided at a rear side of the hydraulic pump and having an upper surface; and
an exhaust gas after-treatment device for purifying exhaust gas from said engine,
wherein an upper surface of said hydraulic pump is positioned lower than an upper surface of said engine,
at least a portion of said tank device has an upper surface, wherein a height of the upper surface of said tank device is almost equal to, or is smaller than, the height of the upper surface of said hydraulic pump, and
said exhaust gas after-treatment device is disposed at a position above both said upper surfaces of said tank device and said hydraulic pump.

2. The construction machine according to claim 1, wherein the upper surface of said hydraulic pump is positioned lower than the upper surface of said counterweight, and said exhaust gas after-treatment device is disposed in the area between a front end of said tank device and a front face of said counterweight that faces said tank device and at a position above both said upper surface of the tank device and that of said hydraulic pump.

3. The construction machine according to claim 2, wherein a recess is formed on the front face of said counterweight that faces said tank device, said recess forming a surface lower in height than the upper surface of the counterweight, and said exhaust gas after-treatment device is disposed over said surface of said recess and between said counterweight and the front end of said upper surface of the tank device.

4. The construction machine according to claim 1, wherein said tank device has a tank portion in front of said upper surface, which tank portion has a height greater than that of said upper surface of said hydraulic pump.

5. The construction machine according to claim 1, wherein said exhaust gas after-treatment device includes a first treatment section having a filter capable of collecting dust contained in the exhaust gas from said engine and a second treatment section capable of decomposing nitrogen oxides contained in the exhaust gas by utilizing a catalyst, said catalyst using urea as a reducing agent.

6. The construction machine according to claim 5, further comprising an aqueous urea tank for storing aqueous urea so as to become capable of being supplied to said second treatment section, said aqueous urea tank being longitudinally juxtaposed to said exhaust gas after-treatment device.

7. The construction machine according to claim 6, further comprising a pair of right and left mounting portions for allowing said exhaust gas after-treatment device to be supported by said base frame, said mounting portions projecting, at front and rear ends of said exhaust gas after-treatment device, toward said aqueous urea tank, from an end of said exhaust gas after-treatment device that is on a side thereof adjacent to said aqueous urea tank, the spacing between said mounting portions being set wider than a transverse dimension of said aqueous urea tank.

* * * * *